Sept. 5, 1961  R. F. ZITKO  2,998,706
SEED STRAND PLANTER
Filed Dec. 19, 1958  3 Sheets-Sheet 3
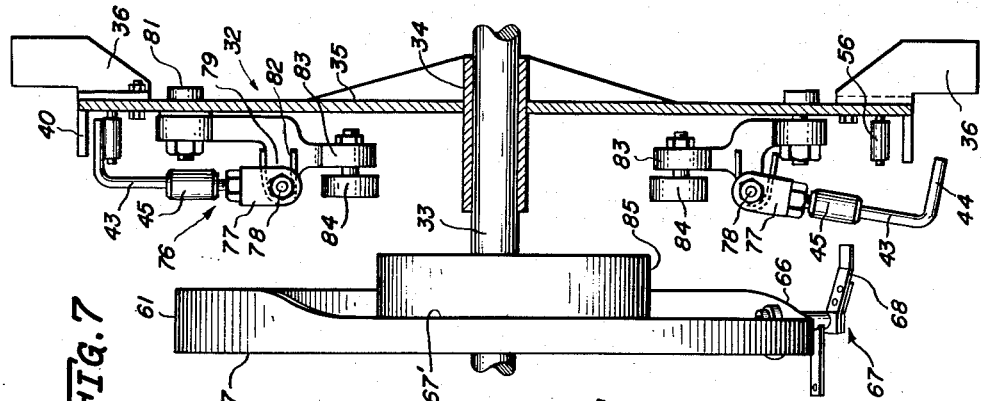
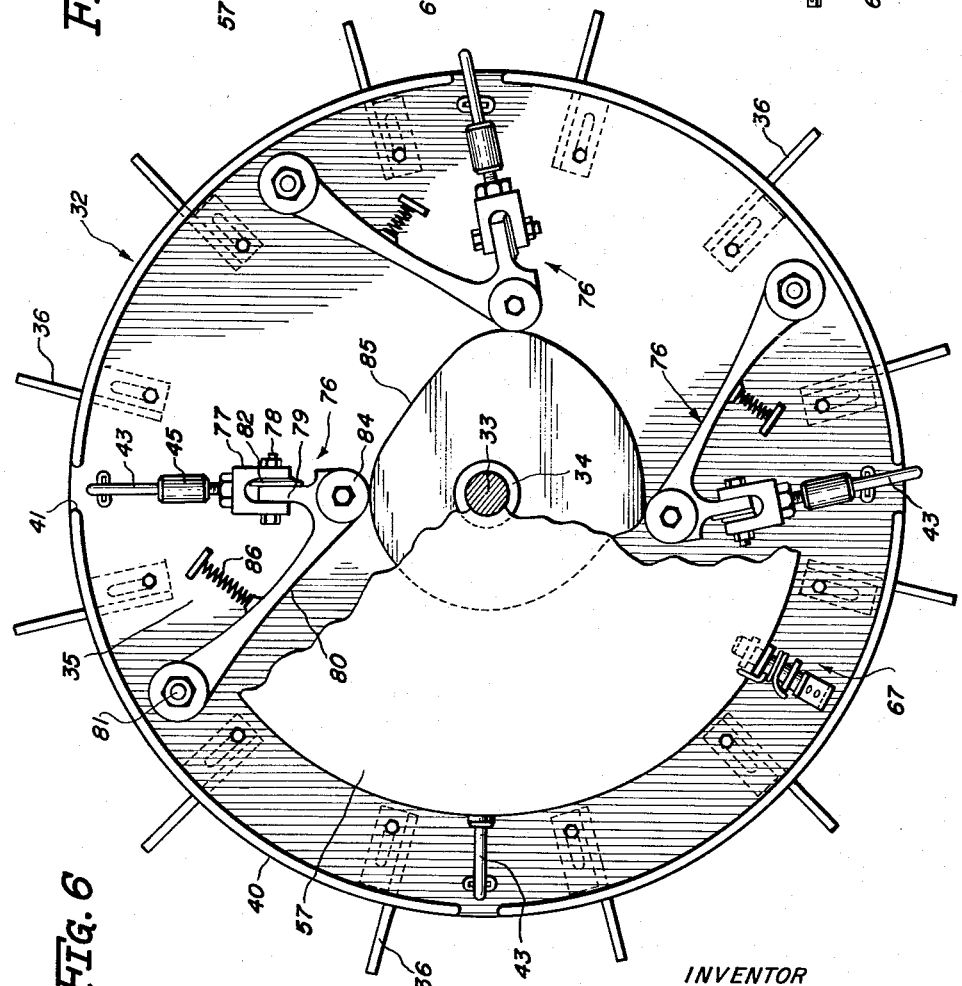
INVENTOR
Ronald F. Zitko
Paul O. Pippel
ATTORNEY

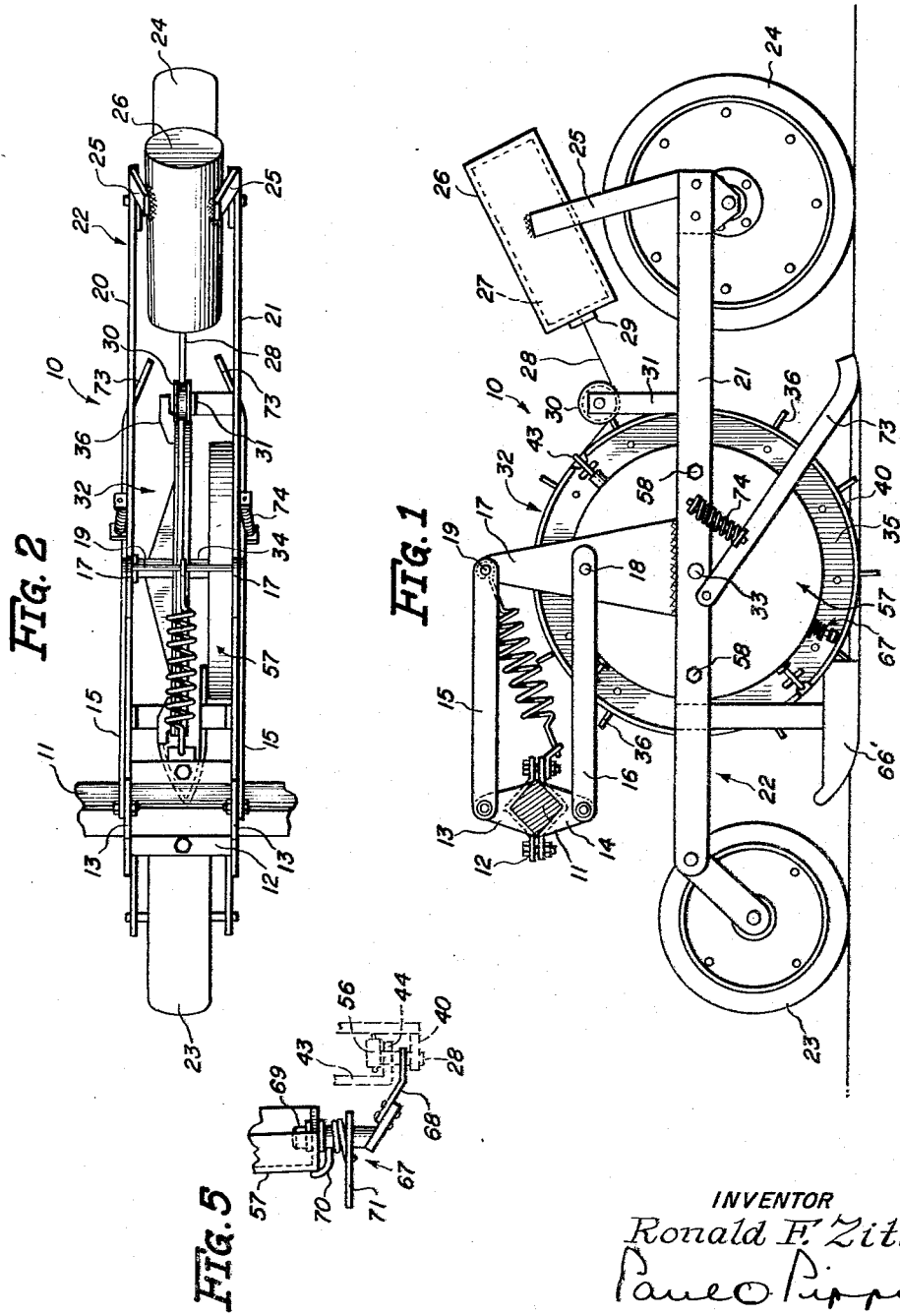

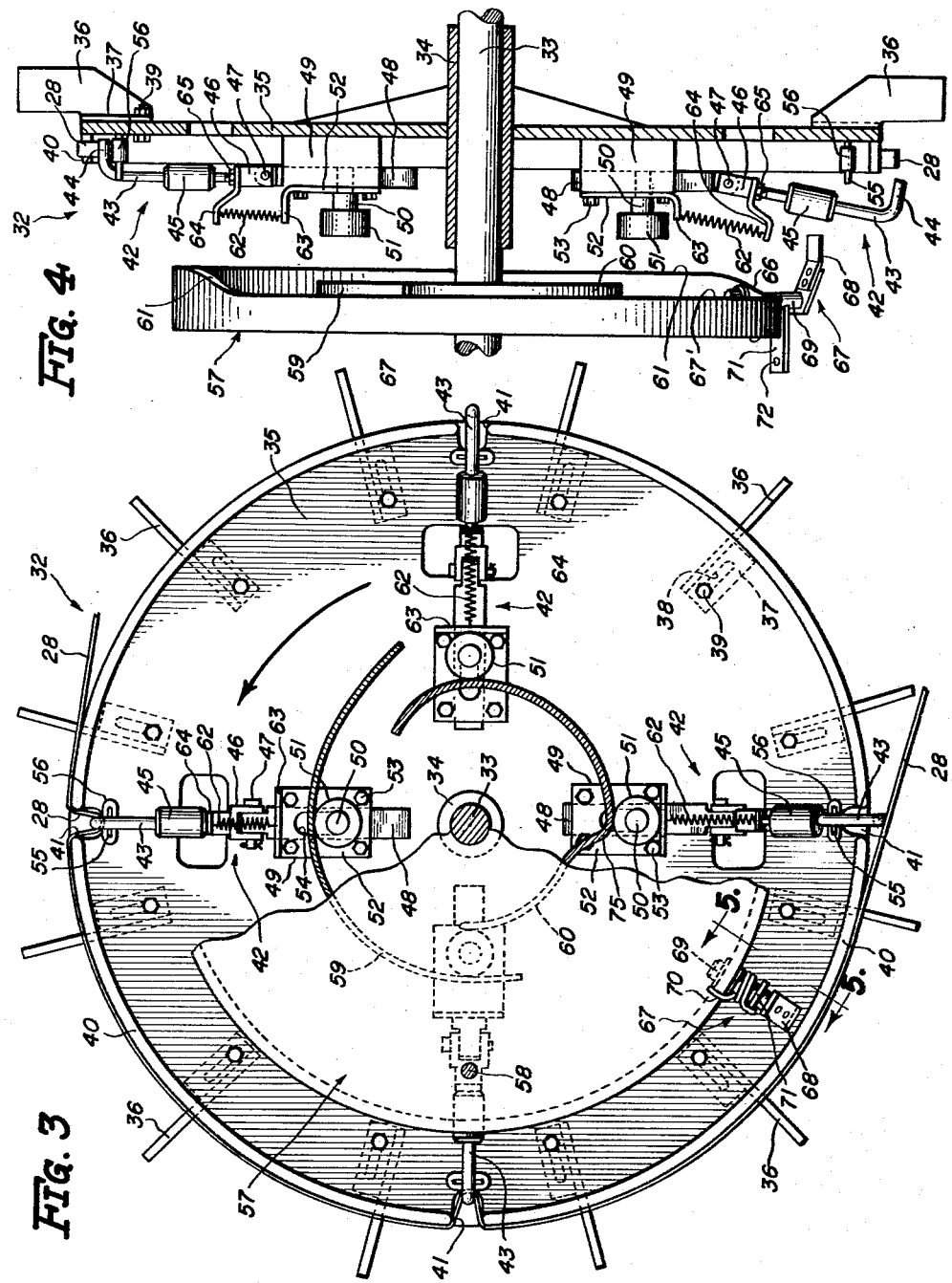

United States Patent Office 2,998,706
Patented Sept. 5, 1961

2,998,706
SEED STRAND PLANTER
Ronald F. Zitko, Cicero, Ill., assignor to International Harvester Company, Chicago, Ill., a corporation of New Jersey
Filed Dec. 19, 1958, Ser. No. 781,732
5 Claims. (Cl. 61—72.6)

This invention relates to agricultural implements and particularly to planters. More specifically, the invention concerns an improved planter for seed tape and the like.

An object of the invention is the provision of an improved planter for seed tape and the like wherein a continuous strand or tape containing seed is fed from a spool or other tape storage device to the ground where it is deposited in a furrow formed by a furrow-forming tool, and covered with a layer of earth.

Another object of the invention is the provision, in a seed tape planter, of an improved feed wheel which receives the tape from the source of supply and delivers it to the ground.

Another object of the invention is the provision in a seed tape planter of an improved feed wheel around which tape is contiuously delivered from the supply source is wound for discharge on the surface of the ground, and having novel means of holding the tape to the wheel and withdrawing it from the supply spool or other storage device.

A further object of the invention is the provision, in a seed tape planter feed wheel, of means for releasably and automatically clamping the tape to the periphery of the wheel as it is fed thereto, and means for actuating the clamping means to seize and hold the tape and to release it after a predetermined rotation of the wheel to allow the tape to be deposited in the furrow.

Another object of the invention is the provision of novel means for planting continuous seed tape and the like, and optionally operable means for severing the tape into lengths.

Other objects and advantages of the invention will become clear from the following detailed description when read in conjunction with the accompanying drawings, wherein:

FIGURE 1 is a view in side elevation of a planter for strand material such as tape, embodying the features of this invention mounted upon a tool bar of the type adapted to be carried by a tractive vehicle, it being understood that a plurality of such planting units may be mounted in laterally spaced relation on the tool bar.

FIGURE 2 is a plan view of the structure shown in FIGURE 1.

FIGURE 3 is an enlarged view in side elevation of the feed wheel, with parts broken away to show the mechanism by which the tape is seized and released from the wheel.

FIGURE 4 is a sectional view of the feed wheel with the parts spaced somewhat to show the relationship therebetween.

FIGURE 5 is a sectional detail taken on the line 5—5 of FIGURE 3.

FIGURE 6 is a modified form of the invention showing a view similar to FIGURE 3, and FIGURE 7 is a sectional view, similar to FIGURE 4 of the structure shown in FIGURE 5.

In the drawings the numeral 10 designates a one-row planter unit mounted on a transversely extending tool bar 11 adapted to be carried by a tractor or the like, only one such planter unit being shown, although it may be understood that for multiple row planting a plurality of planting units 10 may be mounted at laterally spaced locations on the tool bar. The planter unit is mounted upon the tool bar 11 through the intermediary of a clamp 12 having a laterally spaced pair of upstanding and depending ears 13 and 14 to which are pivotally connected the forward ends of laterally and vertically spaced pairs of parallel links 15 and 16, respectively. The rear ends of links 15 and 16 are pivotally connected to standards 17 by separate lower pivot pins 18 and a single transverse pin 19 extending between the standards.

The planter unit 10 includes laterally spaced longitudinally extending frame bars 20 and 21 to which the lower ends of standards 17 are affixed, as by welding. The bars 20 and 21 form parts of a supporting frame 22 carrying a wheel 23 at its forward end and a wheel 24 at its rear end.

A pair of straps 25 secured to the rear ends of the bars 20 and 21 extend upwardly therefrom and are affixed to a cylindrical container 26 in which is received a spool 27 of a continuous tape of cellulosic or other suitable material 28 in which seed and the like is imbedded. The tape 28 is withdrawn from the interior of spool 27 through an outlet 29 in the container 26 and is led around an idler roller 30 mounted upon a bracket 31 secured to the side rail 21 of the frame.

The tape 28 passes under roller 30 and over the periphery of a feed wheel 32 rotatably mounted upon a transverse shaft 33 extending between the frame bars 20 and 21.

Feed wheel 32 comprises a hub 34, receiving shaft 33, and a disk portion 35 to the outer face of which are secured adjacent the periphery thereof and at circumferentially spaced locations, a plurality of ground-engaging lugs 36, each of which has a flange 37 provided with a slot 38 adjustably receiving a bolt 39 passing through the body of the wheel 35.

A rim is provided in the form of a flange 40 projecting inwardly from the periphery of the wheel and having four openings or spaces 41 circumferentially spaced thereabout.

Tape 28 led to wheel 32 engages the outer surface of the rim 40 and is seized or grasped by a clamping apparatus designated at 42. Clamping apparatus 42 comprises a finger 43, the upper end of which is bent to form a hook 44. Finger 43 has a roller 45 mounted thereon and at the end opposite hook 44 is anchored to a clevis 46 mounted on a pivot pin 47 carried at one end of a reciprocable slide member 48 slidably receivable in a mating opening provided in a block 49 affixed to the inner face of the disk portion 35 of the feed wheel. It should be understood that four of the clamping units 42 are provided at circumferentially spaced locations on the wheel 32, in radial alignment with the openings 41. It should also be understood that these clamping units 42 are substantial duplicates, and that a description of one will suffice for all.

Slidable member 48 is in the form of an elongated bar having a stub shaft 50 affixed to and extending upwardly therefrom and having mounted upon its end a roller 51. A cover plate 52 is secured to the surface of block 49 by a plurality of bolts 53, and is provided with a slot 54 to receive stub shaft 50.

Bar 48 is slidable to move finger 43 from a position with the hook 44 projecting through opening 41, as indicated at the bottom of FIGURE 3, to a retracted position with finger 43 withdrawn within the rim 40 and with the hook portion 44 thereof engaging a stop member 55, one of which is mounted on the disk portion 35 just below each of the openings 41 in the rim 40. Stop member 55 is provided with a flexible covering or sleeve 56, preferably of rubber or the like to minimize the danger of injury to the tape to be pressed against it by the finger 43.

At this point it should be noted that seed tape fed to the wheel 32 is wound about the periphery of the wheel and is engaged by the hook 44 of the adjacent finger 43 which is extended and projects from the periphery of the wheel at the bottom and at the right in FIGURE 3 but is retracted within the rim at the top thereof. The tape is thus held securely against the periphery of the wheel until it is released at the bottom thereof for deposit on the ground.

Actuating mechanism is provided for reciprocating the slidable bar 48 in block 49 to extend and retract finger 43 in the form of a disk-shaped member 57 penetrated by shaft 33 and affixed to side frame bar 21 by bolts 58. A pair of cam tracks 59 and 60 are affixed to the innner face of member 57 to project inwardly therefrom for engagement with roller 51 of the respective clamping element 42. In FIGURE 4 the disk shaped member 57 is shown spaced from the wheel disk 35 and with the cam roller 51 out of engagement with the cam tracks 59 and 60. In FIGURE 3 the upper cam roller 51 is shown engaging the inner face of the upper cam track 59, and in this position finger 43 has been retracted to grasp a section of tape 28, draw it inwardly against the stop 55 and hold it in that position. As the implement is propelled over the ground and wheel 32 is rotated by engagement of lugs 36 with the ground, roller 51 follows the inner contour of cam track 59, the roller, after the wheel has traveled 90 degrees to the position shown at the left in FIGURE 3, engaging the outer surface of the lower cam track 60. Due to the curvature of cam track 60, arm 48 is forced outwardly until finger 43 projects beyond the periphery of the wheel as shown at the bottom in FIGURES 3 and 4. From this point for approximately 90°, the radius of the lower cam track 60 remains substantially the same and finger 43 projects beyond the periphery of the rim 40 of the wheel until roller 51 again comes into engagement with the inner face of track 59. The tape is thus seized and held until the wheel has rotated 180° to allow the tape to be released at the bottom for deposit on the ground.

During part of the revolution of the feed wheel the finger 43 is retained in the position shown at the top of FIGS. 3 and 4. That is, the finger is in alignment with the slide bar 48 and is in position to hold the tape between the hook 44 and the stop 55. Although for clarity, member 57 is shown in FIGURE 4 as separated from the body of the feed wheel, it may be understood that when cam roller 51 is in engagement with the track 59, in the position of the parts as shown, roller 45 engages a peripheral flange 61 projecting inwardly from the body of the disk 57 and acting as a cam track for engagement with the rollers 45.

In the position of the parts shown in FIGURE 4 engagement of the outer edge of flange 61 with the upper roller 45 holds it in the position shown against the bias of a spring 62 anchored at its lower end to a flange 63 on the plate 52 and at its other end to a clip 64 secured to and projecting outwardly from the inner end of finger 43. Clip 64 is held on the inner end of finger 43 by engagement on one side with the clevis 46 and on its other side with a nut 65 operatively engageable with threads on the finger 43. Finger 43 is thus biased about the axis of pivot 47 to the position shown at the bottom of FIGURE 4 away from the body of wheel disk 35 and away from engagement with the seed tape. As the member 43 approaches the bottom of the wheel during rotation thereof, roller 45 rides down an incline 66 on the cam track formed by the inner edge of the flange 61 and engages an offset portion 67' of the cam track, allowing spring 62 to move the finger 43 inwardly about its pivot 47. As the wheel continues to rotate roller 45 again rides up to the high part of the cam and as it reaches the top it moves outwardly and is again retracted to the position shown at the top of FIGURES 3 and 4 to seize and hold the tape fed to the wheel.

It has already been pointed out that the tape 28 is led to the feed wheel 32 near the top thereof, is seized by the clamping means 42 and is held on the periphery of the feed wheel during rotation thereof, being released near the bottom of the wheel at its point of contact with the ground. The tape is laid in a furrow made by a furrow forming tool 66' secured to the planter frame 10, and may be deposited as a continuous ribbon or it may be severed by cutting means carried on the disk 57 and indicated at 67.

The tape severing means 67 comprises a cutting blade 68 carried at the lower end of a spindle 69 rotatively mounted in the flange 61 of member 57 on the lower portion thereof near the point of contact of feed wheel 32 with the ground. The operating position of the knife is shown in FIGURE 5 with the blade positioned between the inner surface of rim 40 of the feed wheel and hook 44 resting against stop 55 to sever the tape 28 as the loop thereof passes the knife. When the tape is to be cut into sections the knife is held in the operating position shown and is biased to a disengaged position for planting continuous tape by the provision of a coil spring 70 anchored at one end to the member 57 and at the other end to an arm 71 affixed to the spindle 69 and having an opening 72 therein by which a cable or the like may be attached to arm 71 by which the operator of the vehicle which propels the implement is able to turn spindle 69 against the bias of spring 70 to an operative position of the knife. Cover members 73 are pivotally connected to the frame bars 20 and 21 on opposite sides of the wheel 32, and are biased into engagement with the soil by a spring 74 connected between the bars 20 and 21 and the respective cover members 73. The members 73 are adapted to move dirt inwardly over the tape deposited in the furrow formed by the opener 66'.

As pointed out before, the cam tracks 59 and 60 reciprocate clamping element 42 between the retracted position shown at the top of FIGURE 3 and the extended position therebelow, and that the edge 67 of flange 61 of the relatively stationary member 57 engages the roller 45 and holds it in the position shown at the top in FIGURE 4 until it has reached a position near the bottom thereof, whereupon the roller 45 rides down incline 66 and spring 62 pulls the finger 43 inwardly away from the face of the wheel 32. This allows the tape to leave the wheel and to be deposited in the furrow. The extension of finger 43 to the position shown at the bottom of FIGURES 3 and 4 occurs shortly after the tape has been severed by the knife 68, when it is desired to plant the tape in short lengths or it is severed for any other reason. As will be seen in FIGURE 3, a portion of the cam 60 first engaged by roller 51 is such as to maintain the slidable clamping member 42 retracted until the part 75 is reached when the clamp 42 quickly moves to the position shown.

In the modified form of the invention shown in FIGURES 6 and 7 like parts are designated by like numerals. An oscillating clamping unit is designated at 76 wherein the finger 43 carrying its cam roller 45 is anchored to a clevis 77 pivotally mounted on a pin 78 carried by a lug 79 at one end of a lever or arm 80 pivotally mounted at 81 on the body 35 of wheel 32. In this case swinging of the finger 43 about the pivot 78 to the position shown at the bottom of FIGURE 7 is urged by a coil spring 82. Another lug 83 on lever arm 80 carries a cam roller 84 corresponding to the cam roller 51 which engages a single cam track 85 carried by the stationary member 57 and the roller is biased to engagement with the surface of said cam by a spring 86 anchored to the body 35 of the wheel and to the arm 80. Movement of roller or cam follower 84 around the track 85 causes oscillation of the lever 80 to extend and retract finger 43, the operation of seizing or grasping the tape, cutting it into sections, if desired, and raising it to allow it to be deposited in the furrow being in principle the same as that described for FIGURES 1 to 5.

It is believed that the operation of the planting apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In a planter for seed tape and the like having a mobile frame and a source of continuous tape, a feed wheel adapted to receive the tape from the source having a main body and a rim on which the tape is wound for delivery to the ground upon rotation of the wheel, and clamping means for holding the tape to the wheel, comprising a guide member secured to the main body of the wheel, a clamping member mounted in said guide member for reciprocating movement therein in a plane parallel to the plane of said main body, means on the frame operatively connected to said clamping member for reciprocation thereof, and an opening in said rim accommodating sliding movement of said clamping member therethrough.

2. In a planter for seed tape and the like having a mobile frame and a source of continuous tape, a feed wheel adapted to receive the tape from the source having a main body and a rim on which the tape is wound for delivery to the ground upon rotation of the wheel, and clamping means for holding the tape to the wheel, comprising a guide member secured to the main body of the wheel, a clamping member mounted in said guide member for reciprocating movement therein in a plane parallel to the plane of said main body, means on the frame operatively connected to said clamping member for reciprocation thereof, an opening in said rim accommodating sliding movement of said clamping member therethrough, said clamping member having a hook portion adapted to engage the outer surface of the tape and being retractable to form a loop of tape inside the rim and provide a space between the hook and the rim, and cutting means mounted on the frame and adapted to be moved across said opening in said space to sever the tape.

3. In a planter for seed tape and the like having a mobile frame and a source of continuous tape, a feed wheel having a main body and a rim on which the tape is wound for delivery to the ground upon rotation of the wheel, and means for holding the tape to the wheel, comprising a lever pivotally connected at one end to said main body of the wheel for oscillation in a plane parallel thereto, and a clamping element carried by the lever for oscillation therewith, said wheel rim having an opening therein to accommodate movement of the clamping element therethrough, said element being slidable from a position beyond the outer periphery of the rim to a position radially inwardly thereof.

4. In a planter for seed tape and the like having a mobile frame and a source of continuous tape, a feed wheel adatped to receive the tape from the source having a main body and a rim on which the tape is wound for delivery to the ground upon rotation of the wheel, and clamping means for holding the tape to the wheel, comprising a lever pivotally connected at one end to said main body of the wheel for oscillation in a plane parallel thereto, a clamping element carried by the lever for oscillation therewith, said wheel rim having an opening therein to accommodate movement of the clamping element therethrough, said element being slidable from a position beyond the outer periphery of the rim to a position radially inwardly thereof, means on the frame operatively engageable with said lever for oscillating the latter during rotation of the wheel, and spring means connected between the wheel and lever to oppose swinging thereof in one direction.

5. In a machine for planting tape and the like wherein tape drawn from a supply source is fed continuously to and wound about the periphery of a rotatable ground-engaging wheel which deposits the tape on the ground during the rotation of the wheel, the combination of clamping means mounted on the wheel and radially and axially movable relative thereto, means in the mounting of said clamping means on the wheel for biasing the clamping means axially away from the wheel, means carried by the machine and operatively engageable with the clamping means during rotation of the wheel for periodically moving the clamping means axially against the bias of said biasing means to a position in radial alignment with the tape on the periphery of said wheel and retaining the clamping means in this position except for the period of ground engagement of a predetermined portion of the wheel, and actuating means mounted on the machine operatively engageable with said clamping means during rotation of the wheel to periodically radially reciprocate said clamping means from said position radially outwardly of the periphery of said wheel and tape and in radial alignment with the tape thereon to a position in operative engagement with said tape to hold the latter on the wheel.

References Cited in the file of this patent

UNITED STATES PATENTS

| | | |
|---|---|---|
| 355,478 | Simmons | Jan. 4, 1887 |
| 1,292,082 | Sanford | Jan. 21, 1919 |